United States Patent [19]

Degnan Jr. et al.

[11] Patent Number: 5,290,744
[45] Date of Patent: Mar. 1, 1994

[54] HYDROCRACKING PROCESS USING ULTRA-LARGE PORE SIZE CATALYSTS

[75] Inventors: Thomas F. Degnan Jr., Moorestown; Kathleen M. Keville, West Deptford; Michael E. Landis, Woodbury; David O. Marler, Deptford; Dominick N. Mazzone, Wenonah, all of N.J.

[73] Assignee: Mobil Oil Corporation, Fairfax, Va.

[21] Appl. No.: 956,196

[22] Filed: Oct. 5, 1992

Related U.S. Application Data

[62] Division of Ser. No. 734,983, Jul. 24, 1991, Pat. No. 5,183,557.

[51] Int. Cl.$^5$ .............................................. B01J 29/04
[52] U.S. Cl. .................................................. 502/67
[58] Field of Search ................................ 502/67, 61

[56] References Cited

U.S. PATENT DOCUMENTS

| | | | |
|---|---|---|---|
| 3,755,145 | 8/1973 | Orkim | 208/111 |
| 3,864,283 | 2/1975 | Schutt | 502/67 |
| 3,884,835 | 5/1975 | Vaughan | 252/451 |
| 4,091,079 | 5/1978 | Vaughan | 423/328 |
| 4,383,913 | 5/1983 | Powell et al. | 208/59 |
| 4,486,296 | 12/1984 | Oleck et al. | 208/111 |
| 4,673,559 | 6/1987 | Derouane et al. | 423/306 |
| 4,696,732 | 9/1987 | Angevine et al. | 208/111 |
| 4,757,041 | 7/1988 | Oleck et al. | 502/65 |
| 4,791,088 | 12/1988 | Chu et al. | 502/232 |
| 4,880,611 | 11/1989 | von Ballmoos et al. | 423/306 |
| 4,946,580 | 8/1990 | Fajula et al. | 502/67 |
| 4,983,276 | 1/1991 | Absil et al. | 502/67 |
| 5,098,684 | 3/1992 | Kresge et al. | 423/277 |
| 5,102,643 | 4/1992 | Kresge et al. | 423/328 |

OTHER PUBLICATIONS

Szostak,-Zeolites, Facts, Figures, Futures, Ed. Jacobs et al., Elsevier Science Publ. bV, 1989, pp. 439-446.

*Primary Examiner*—Carl F. Dees
*Attorney, Agent, or Firm*—A. J. McKillop; M. D. Keen

[57] ABSTRACT

A hydrocracking catalyst with improved distillate selectivity comprises, in addition to a metal component, a mesoporous crystalline material together with a molecular sieve component of relatively smaller pore size. The metal component of the catalyst is preferably associated with the high-surface area mesoporous component and high-metal loadings can be achieved in order to give good hydrogenation activity to the catalyst. The relatively smaller pore size component is preferably a large pore size zeolite such as zeolite Y or an intermediate pore size zeolite such as ZSM-5; this component provides a higher level of acidic functionality than the mesoporous component, achieving a functional separation in the hydrocracking process, permitting the metals loading and acidic activities to be optimized for good catalyst selectivity and activity. The catalysts enable the distillate selectivities comparable to amorphous catalyst to be achieved with improved conversion activity.

32 Claims, 2 Drawing Sheets

HYDROCRACKING PROCESS USING ULTRA-LARGE PORE SIZE CATALYSTS

This is a division of copending application Ser. No. 07/734,983, filed on 24 Jul., 1991 now U.S. Pat. No. 5,183,557.

FIELD OF THE INVENTION

This invention relates to a hydrocracking process, especially a fuels hydrocracking process, which is carried out with a catalyst comprising a combination of catalytically-active materials.

CROSS REFERENCE TO RELATED APPLICATIONS

This application is related to copending application Ser. No. 07/625,245 (Vartuli et al) filed 10 Dec. 1990, now U.S. Pat. No. 5,098,684 which is a continuation-in-part of Ser. No. 07/470,008, now U.S. Pat. No. 5,102,643 both of which describe the ultra-large pore size crystalline catalytic materials used in the catalysts described in this application.

This application is also related to Ser. No. 07/734,850, filed concurrently which also relates to hydrocracking using ultra-large pore size catalysts.

Application Ser. Nos. 07/734,971, filed 24 Jul. 1991 (now abandoned), and 07/734,826, filed 24 Jul. 1991, relate to lube hydrocracking processes using ultra-large pore size catalytic materials.

BACKGROUND OF THE INVENTION

Hydrocracking is a process which has achieved widespread use in petroleum refining for converting various petroleum fractions to lighter and more valuable products, especially distillates such as jet fuels, diesel oils and heating oils. Hydrocracking is generally carried out in conjunction with an initial hydrotreating step in which the heteroatom-containing impurities in the feed are hydrogenated without a significant degree of bulk conversion. During this initial step, the heteroatoms, principally nitrogen and sulfur, are converted to inorganic form (ammonia, hydrogen-sulfide) and these gases may be removed prior to the subsequent hydrocracking step although the two stages may be combined in cascade without interstage separation as, for example, in the Unicracking-JHC process and in the moderate pressure hydrocracking process described in U.S. Pat. No. 4,435,275.

In the second stage of the operation, the hydrotreated feedstock is contacted with a bifunctional catalyst which possesses both acidic and hydrogenation/dehydrogenation functionality. In this step, the characteristic hydrocracking reactions occur in the presence of the catalyst. Polycyclic aromatics in the feed are hydrogenated, and ring opening of aromatic and naphthenic rings takes place together with dealkylation. Further hydrogenation may take place upon opening of the aromatic rings. Depending upon the severity of the reaction conditions, the polycyclic aromatics in the feed will be hydrocracked to paraffinic materials or, under less severe conditions, to monocylic aromatics as well as paraffins. Naphthenic and aromatic rings may be present in the product, for example, as substituted naphthenes and substituted polycyclic aromatics in the higher boiling products, depending upon the degree of operational severity.

The bifunctional catalyst typically comprises a metal component which provides the hydrogenation/dehydrogenation functionality and a porous, inorganic oxide support provides the acidic function. The metal component typically comprises a combination of metals from Groups IVA, VIA and VIIIA of the Periodic Table (IUPAC Table) although single metals may also be encountered. Combinations of metals from Groups VIA and VIIIA are especially preferred, such as nickel-molybdenum, cobalt-molybdenum, nickel-tungsten, cobalt-nickel-molybdenum and nickel-tungsten-titanium. Noble metals of Group VIIIA especially platinum or palladium may be encountered but are not typically used for treating high boiling feeds which tend to contain significant quantities of heteroatoms which function as poisons for these metals.

The porous support which provides the acidic functionality in the catalyst may comprise either an amorphous or a crystalline material or both. Amorphous materials have significant advantages for processing very high boiling feeds which contain significant quantities of bulky polycyclic materials (aromatics as well as polynaphthenes) since the amorphous materials usually possesses pores extending over a wide range of sizes and the larger pores, frequently in the size range of 100 to 400 Angstroms (Å) are large enough to provide entry of the bulky components of the feed into the interior structure of the material where the acid-catalyzed reactions may take place. Typical amorphous materials of this kind include alumina and silica-alumina and mixtures of the two, possibly modified with other inorganic oxides such as silica, magnesia or titania.

Crystalline materials, especially the large pore size zeolites such as zeolites X and Y, have been found to be useful for a number of hydrocracking applications since they have the advantage, as compared to the amorphous materials, of possessing a greater degree of activity, which enables the hydrocracking to be carried out at lower temperatures at which the accompanying hydrogenation reactions are thermodynamically favored. In addition, the crystalline catalysts tend to be more stable in operation than the amorphous materials such as alumina. The crystalline materials may, however, not be suitable for all applications since even the largest pore sizes in these materials, typically about 7.4 Å in the X and Y zeolites, are too small to permit access by various bulky species in the feed. For this reason, hydrocracking of residuals fractions and high boiling feeds has generally required an amorphous catalyst of rather lower activity.

The crystalline hydrocracking catalysts generally tend to produce significant quantities of gasoline boiling range materials (approximately 330° F.-, 165° C.-) materials as product. Since hydrocracked gasolines tend to be of relatively low octane and require further treatment as by reforming before the product can be blended into the refinery gasoline pool, hydrocracking is usually not an attractive route for the production of gasoline. On the other hand, it is favorable to the production of distillate fractions, especially jet fuels, heating oils and diesel fuels since the hydrocracking process reduces the heteroatom impurities characteristically present in these fractions to the low level desirable for these products. The selectivity of crystalline aluminosilicate catalysts for distillate production may be improved by the use of highly siliceous zeolites, -for example, the zeolites possessing a silica: alumina ratio of 50:1 or more, as described in U.S. Pat. No. 4,820,402 (Partridge et al), but even with this advance in the technology, it would still be desirable to integrate the characteristics of the amorphous materials with their large pore sizes capable of accommodating the bulky components of typical hydrocracking feeds, with the activity of the zeolite catalysts.

In fuels hydrocracking, the zeolite content of the catalyst is conventionally as high as possible for the desired acidity; conversely the amount of matrix which supports the metal component is limited and as the proportion of zeolite in the catalyst increases, the amount of support available for the metal component decreases with the result that the hydrogenation activity becomes limited at the high zeolite loadings requisite to fuels hydrocracking.

In principal, the advantages of the amorphous and the crystalline material in hydrocracking catalysts could be integrated by the use of active supports for crystalline materials but the difference in activity and selectivity between the amorphous and crystalline materials has not favored the utilization of such catalysts.

In copending application Ser. No. 07/734,850, filed 24 Jul. 1991, we have disclosed a hydrocracking process which utilizes a catalyst with an ultra-la-ge pore sized support material. The ultra-large pore sized support materials are typically metallosilicates, e.g., aluminosilicates, which are synthesized in the presence of longchain alkylammonium cations such as cetyltrimethylammonium cations. These support materials are characterized by a high-surface area which is capable of supporting a higher metal content than conventional hydroprocessing catalysts and therefore offer particular advantages in hydroprocessing applications such as hydrocracking.

The ultra-large pore size support materials used in the hydrocracking catalysts referred to above, have the advantage that relatively high levels of metal can be accommodated on the support so that the hydrogenation activity of the catalyst is relatively high. The acidic functionality of these catalysts is, however, generally lower than that of conventional zeolite-based hydrocracking catalysts so that it is relatively more difficult to obtain the high conversion levels conventionally used in fuels hydrocracking.

SUMMARY OF THE INVENTION

We have now found that the desirable features of the ultra-large pore size hydroprocessing catalysts and the zeolite hydroprocessing catalysts may be combined by utilizing the ultra-large poor size material to provide additional surface area for the support of the metal component of the catalyst while a zeolite provides the acidic functionality required for cracking activity. The resulting combination catalyst enables both the metal loading and the acidic functionality of the catalyst to be optimized with the result that good hydrogenation activity is obtained together with good cracking activity and the resulting catalysts are useful in fuels hydrocracking processes, especially where high conversion levels are desired.

According to the present invention, there is therefore provided a hydrocracking catalyst which comprises a metal hydrogenation/dehydrogenation component, a mesoporous siliceous material and a crystalline zeolite, preferably a large pore size zeolite such as zeolite USY. These catalysts are useful in hydrocracking processes in which a hydrocarbon feed, normally a high-boiling feed such as a gas oil, is subject to hydrocracking in the presence of the catalyst. The hydrocracking is preferably carried out under moderate pressure conditions and is capable of producing high-quality kerosene and distillate with good selectivity.

DRAWINGS

In the accompanying drawings:
FIGS. 1 and 2 are graphs showing the performance of the present catalyst mixtures as described below.

DETAILED DESCRIPTION

Feedstock

Figure 1:
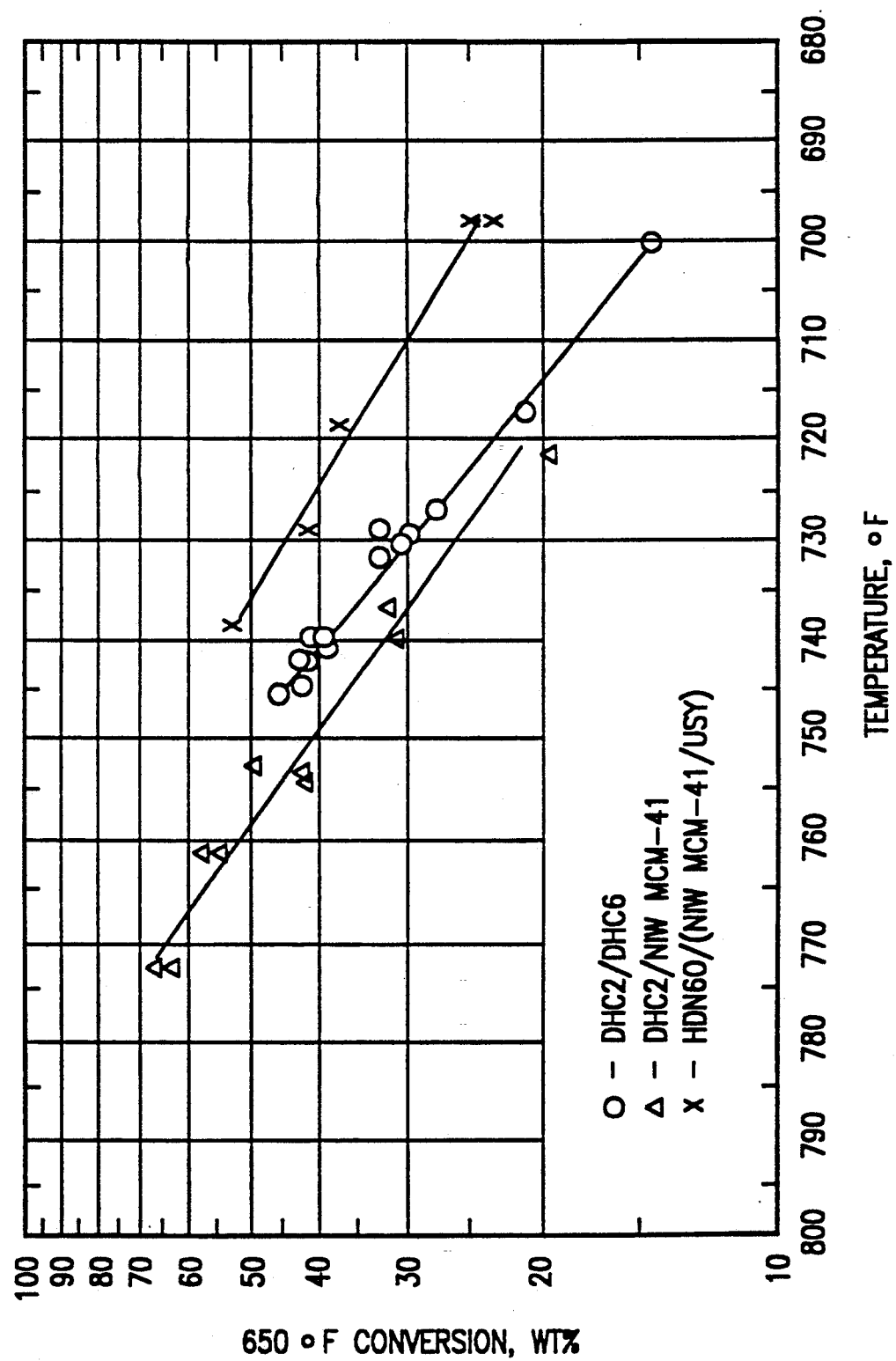

The feedstock for the present process is usually a heavy oil fraction having an initial boiling point of 200° C. (about 400° F.) and normally of 345° C. (about 650° F.) or higher, although the present catalysts may also be used for hydrocracking lighter fractions such as naphtha or Udex raffinates or extracts or catalytic cracker light cycle oil. Suitable high boiling feedstocks include gas oils such as vacuum gas oil, coker gas oil, lube extracts produced by the solvent extraction of lube oil fractions using solvents such as phenol, furfural or N-methyl-pyrrolidone, visbreaker oil or deasphalted oil. Normally, the feedstock will have an extended boiling range, e.g. 345° C. to 590° C. (about 650° F. to 1100° F.) but may be of more limited ranges with certain feedstocks or alternatively may include or comprise non-distillable i.e. residual, fractions. The heteroatom is not critical: the nitrogen content will generally be in the range 200 to 1500 ppmw. Likewise, the sulfur content is not critical and typically may range as high as 5 percent by weight. Sulfur contents of 2.0 to 3.0 percent by weight are common. The heavy hydrocarbon oil feedstock will normally contain a substantial amount boiling above 230° C. (450° F.) and will normally have an initial boiling point of at least about 290° C. (about 550° F.), more usually about 345° C. (about 650° F.). Typical boiling ranges will be about 345° to 565° C. (about 650° to 1050° F.) or about 345° to 510° C. (650° to 950° F.) but oils with a narrower boiling range may, of course, be processed, for example, those with a boiling range of about 345° to 455° C. (about 650° to 850° F.). Heavy gas oils are often of this kind as are heavy cycle oils and other non-residual materials. It is possible to co-process materials boiling below 260° C. (about 500° F.) but the degree of conversion will be lower for such components. Feedstocks containing lighter ends of this kind will normally have an initial boiling point above 150° C. (about 300° F.).

The heavy oil feeds will comprise high molecular weight long chain paraffins and high molecular weight aromatics with a large proportion of fused ring aromatics. During the processing, the fused ring aromatics are hydrogenated by the metal function on the catalyst, naphthenes are cracked by the acidic catalyst and the paraffinic cracking products, together with paraffinic components of the initial feedstock undergo isomerization to iso-paraffins with some cracking to lower molecular weight materials. Hydrogenation of unsaturated side chains on the monocyclic cracking residues of the original polycyclics is catalyzed by the metal component of the hydrocracking catalyst to form substituted monocyclic aromatics which are highly desirable end products.

High quality products exemplified by low sulfur, high hydrogen content, high cetane number (30–45) diesel fuel oils and similar high smoke point jet fuels (typical smoke point 20-25 mm) may be obtained with suitable VGO feeds.

PROCESS CONDITIONS

General

The feedstock is heated to an elevated temperature and is then passed over the hydrotreating and hydrocracking catalysts in the presence of hydrogen. Because the thermodynamics of hydrocracking become unfavorable at temperatures above about 450° C. (about 850° F.) temperatures above this value will not normally be used. In addition, because the hydrotreating and hydrocracking reactions are exothermic, the feedstock need not be heated to the temperature desired in the catalyst bed which is normally in the range 290°, usually 360° C. to 440° C. (about 550°, usually 675° F. to 825° F.). At the beginning of the process cycle, the temperature employed will be at the lower end of this range but as the catalyst ages, the temperature may be increased in order to maintain the desired degree of activity.

Typically, the heavy oil feedstock is passed over the catalysts in the presence of hydrogen. The space velocity of the oil is usually in the range 0.1 to 10 LHSV, preferably 0.2 to 2.0 LHSV and the hydrogen circulation rate from 250 to 1000 $n.1.1^{-1}$. (about 1400 to 5600 SCF/bbl) and more usually from 300 to 800 (about 1685 to 4500 SCF/bbl). Hydrogen partial pressure is usually at least 75 percent of the total system pressure with reactor inlet pressures normally being in the range of 400 to 1500 psig (about 2860 to about 10445 kPa abs), more comonly from 800 to 1500 psig (about 5620 to 10445 kPa abs) for low to moderate pressure operation, which is the preferred mode with the present catalyst, although high pressure operation above 1500 psig (about 10445 kPa abs) is also feasible and with similar advantages, especially for fuels hydrocracking. In the high pressure mode, pressures from about 1500 to 5000 psig (about 10445 to 34575 kPa abs) are typical although higher pressures may also be utilized with the upper limit usually being set by equipment constraints. When operating at low conversions, for example, less than 50 weight percent conversion to 345° C.-(about 650° F.-) products, the pressure may be considerably lower than normal, conventional practices. We have found that total system pressures of about 700 to 1200 psig (about 4930 to 8375 kPa abs) are satisfactory, as compared to the pressures of at least 1500 psig (about 10445 kPa) normally used in commercial hydrocracking processes. Low conversion may be obtained by suitable selection of other reaction parameters, e.g., temperature, space velocity, choice of catalyst, and even lower pressures may be used. Low pressures are desirable from the point of view of equipment design since less massive and consequently cheaper equipment will be adequate. Similarly, lower pressures usually influence less aromatic saturation and thereby permit economy in the total amount of hydrogen consumed in the process.

The overall conversion may be maintained at varying levels depending on the nature of the feed and on the desired product characteristics. It is possible to operate the process at a low conversion level, less than 50 weight percent to lower boiling products, usually 340° C.-(650° F.-) products from the heavy oil feedstocks used while still maintaining satisfactory product quality. The conversion may, of course, be maintained at even lower levels, e.g. 30 or 40 percent by weight. The degree of cracking to gas ($C_4$—) which occurs at these low conversion figures is correspondingly low and so is the conversion to naphtha (200° C.-, 400° F.-); the distillate selectivity of the process is accordingly high and overcracking to lighter and less desired products is minimized. It is believed that in cascade operation this effect is procured, in part, by the effect of the ammonia carried over from the first stage. Control of conversion may be effected by conventional expedients such as control of temperature, pressure, space velocity and other reaction parameters.

Surprisingly, it has been found that the presence of nitrogen and sulfur compounds in the second stage feed does not adversely affect catalyst aging in the absence of interstage separation and, in fact, the present hydrocracking catalysts have been found to be extremely effective in reducing the nitrogen content of the feed.

The present process has the advantage that it may be operated under low to moderate pressure conditions in existing low pressure equipment. For example, if a desulfurizer is available, it may be used with relatively few modifications since the present process may be operated at low pressures comparable to the low severity conditions used in desulfurization. This may enable substantial savings in capital costs to be made since existing refinery units may be adapted to increase the pool of distillate products.

Hydrotreating

The feed is preferably passed over a hydrotreating catalyst before the hydrocracking catalyst in order to convert nitrogen and sulfur containing compounds to gaseous ammonia and hydrogen sulfide. At this stage, hydrocracking is minimized but partial hydrogenation of polycyclic aromatics proceeds, together with a limited degree of conversion to lower boiling (345° C.-, 650° F.-) products. The catalyst used in this stage may be a conventional denitrogenation (denitrification) catalyst. Catalysts of this type are relatively immune to poisoning by the nitrogenous and sulfurous impurities in the feedstock and, generally comprise a non-noble metal component supported on an amorphous, porous carrier such as silica, alumina, silica-alumina or silica-magnesia. Because extensive cracking is not desired in this stage of the process, the acidic functionality of the carrier may be relatively low compared to that of the subsequent hydrocracking catalyst. The metal component may be a single metal from Groups VIA and VIIIA of the Periodic Table such as nickel, cobalt, chromium, vanadium, molybdenum, tungsten, or a combination of metals such as nickel-molybdenum, cobalt-nickel-molybdenum, cobalt-molybdenum, nickel-tungsten or nickel-tungsten-titanium. Generally, the metal component will be selected for good hydrogen transfer activity; the catalyst as a whole will have good hydrogen transfer and minimal cracking characteristics. The catalyst should be pre-sulfided in the normal way in order to convert the metal component (usually impregnated into the carrier and converted to oxide) to the corresponding sulfide.

In the hydrotreating (denitrogenation) stage, the nitrogen and sulfur impurities are converted to ammonia and hydrogen sulfide. At the same time, the polycyclic aromatics are partially hydrogenated to form naphthenes and hydroaromatics which are more readily cracked in the second stage. The effluent from the first stage may be passed directly to the second or hydrocracking stage without the conventional interstage separation of ammonia or hydrogen sulfide. Hydrogen quenching may be carried out in order to control the effluent temperature and to control the catalyst temperature in the second stage. However, interstage separation of ammonia and hydrogen sulfide and light fractions may be carried out, especially with the noble metal hydrocracking catalysts which are more sensitive to the impurities.

The relative proportions of the hydrocracking and the hydrotreating catalysts may be varied according to the feedstock in order to convert the nitrogen in the feedstock to ammonia before the charge passes to the hydrocracking step; the object is to reduce the nitrogen level of the charge to a point where the desired degree of conversion by the hydrocracking catalyst is attained with the optimum combination of space velocity and reaction temperature. The greater the amount of nitrogen in the feed, the greater then will be the proportion of hydrotreating (denitrogenation) catalyst relative to the hydrocracking catalyst. If the amount of nitrogen in the feed is low, the catalyst ratio may be as low as 10:90 (by volume, denitrogenation: hydrocracking). In general, however, ratios between 25:75 to 75:25 will be used. With many stocks an approximately equal volume ratio will be suitable, e.g. 40:60, 50:50 or 60:40.

Hydrocracking

The effluent from the denitrogenation/desulfurization stage is passed to the hydrocracking step to crack partially hydrogenated aromatics and carry out the other characteristic reactions which take place over the hydrocracking catalyst.

The hydrocracking is carried out in the presence of a catalyst which contains three essential components. The first component is the metal which provides the desired hydrogenation/dehydrogenation functionality and this component is supported on the two porous components, namely, the mesoporous crystalline material (which also provides some of the acidic functionality of the catalyst) and the crystalline zeolite which may ber a large pore zeolite such as zeolite USY, a medium (intermediate) pore size zeolite such as ZSM-5 or a small pote size zeolite such as erionite.

Hydrocracking Catalyst Metal Component

The hydrogenation-dehydrogenation component is provided by a metal or combination of metals. Noble metals of Group VIIIA, especially palladium, platinum, or base metals of Groups IVA, VIA and VIIIA, especially chromium, molybdenum, tungsten, cobalt and nickel, may be used. The combination of at least one Group VIA metal such as tungsten with at least one Group VIIA metal such as nickel is particularly preferred for many applications, for example, combinations such as nickel-molybdenum, cobalt-nickel , nickel-tungsten, cobalt-nickel-molybdenum and nickel-tungsten-titanium. For certain applications palladium or platinum may be preferred.

The content of the metal component will vary according to its catalytic activity. Thus, the highly active noble metals may be used in smaller amounts than the less active base metals. For example, about 1 wt. percent or less palladium or platinum will be effective and in a preferred base metal combination, about 7 wt. percent nickel and about 2.1 to about 21 wt. percent tungsten, expressed as metal. The present catalysts are, however, notable in that the mesoporous materials which act as a support for the metal component are capable of including a greater proportion of metal than previously known conventional supports because of their extraordinarily large surface area. The metal component may exceed about 30 percent in a monolayer and metal contents of up to about 40 percent or even more may be achieved. The hydrogenation component can be exchanged onto the support materials when the metal is in the cationic form or alternatively, may be impregnated into them or physically admixed with them. Palladium or platinum compounds in which the metal is in the form of a cation of cationic complex, e.g., Pd(NH$_3$)$_4$Cl$_2$ or PT(NH$_3$)$_4$Cl$_2$ are particularly useful for exchange of these metals onto the support. Anionic complexes such as the molybdate, vanadate and metatungstate ions may be used where the metal component is to be impregnated into the support.

Mesoporous Crystalline Component

One of the two acidic components of the hydrocracking catalyst is a mesoporous crystalline material. When it is used in the present catalysts, the mesoporous crystalline material is at least partly in the hydrogen form in order to provide the desired acidic functionality for the cracking reactions which are to take place.

The high surface area of the mesoporous material permits a significant proportion of the metal component of the catalyst to be supported without difficulty, making an extremely effective use of the high surface area and porousity of these materials. The high-surface area and high porosity of the mesoporous support materials permits high metal loadings to be readily accommodated and in addition, these metal loadings may be put on to the support by direct impregnation even at high-loading. Loadings of 25 percent or more, for example, 30 to 40 percent metal may be obtained by direct impregnation of the metals onto the calcined mesoporous support.

The mesoporous support materials and their preparation are disclosed in Ser. No. 07/734,850 to which reference is made for a description of the mesoporous materials and their preparation and properties and a description of their use in hydrocracking catalysts. As disclosed in Ser. No. 07/734,850, these materials may be characterizd by their X-ray diffraction patterns in which there is at least one line with a relative intensity of at least 100 at a d-spacing of greater than 18 Å. In order to obviate the effect of the metal content of the catalyst, the X-ray pattern is best determined on the calcined, metal-free material, especially at high metal contents. The prefered mesoporous support material is a crystalline material which is an inorganic, porous non-layered material having a hexagonal arrangement of uniformly-sized pores with a maximum perpendicular cross section pore dimension of at least about 13 Å, and typically from within the range from about 13 to 200 Å. A preferred form of this crystalline composition, is the aluminosilicate with the structure identified as that of MCM-41 which exhibits a hexagonal electron diffraction pattern that can be indexed with a d$_{100}$ value greater than about 18 Å and a benzene absorption capacity greater than 15 grams benzene/100 grams crystal at 50 Torr and 25° C. Reference is made to Ser No. 07/734,850 for a description of the preferred hexagonal support materials and their preparation.

Zeolite Component

The third component of the hydrocracking catalyst is a crystalline metallosilicate conventionally referred to as a zeolite. Zeolites are conventionally classified as large pore-size, intermediate pore-size or small pore-size, depending upon the structure of the zeolite and this form of nomenclature is used here although the significantly larger pores sizes of the mesoporous materials makes it inappropriate to refer to zeolites such as zeolite Y as "large pore" on the same basis. Since these designations are recognized for the zeolites, they are, however, used here in reference to them.

The intracrystalline pore volume of the large pore-size materials is accessible through apertures formed of rings of twelve $SiO_4$ tetrahedra which in the zeolites typical of this class have a diameter of at least about 7.4 Å. The medium or intermediate pore size pentasil zeolites, such as ZSM-5, ZSM-11 and ZSM-23 have a 10-ring system and the small pore size zeolites such as erionite and zeolite A have an 8-ring system. These characteristic structural elements are discussed in Hoelderich, Zeolites: Catalysts For Organic Syntheses, *Angewandte Chemie* 27, No. 2, 226–246 (1988). Rather than make a determination of the zeolite type according to structure it is often more convenient, however, to classify by means of the Constraint Index of the zeolite, as described by Frilette in *J. Catalysis* 67, 218–222 (1981). Consistent with the classification implied by Frilette, the large pore size zeolites with 12-ring windows such as the faujasite zeolites have Constraint Indices below 1 and the intermediate pore sized zeolites exhibit a Constraint Index of 1 to about 12, ranking them though the values characteristic of the small size zeolite such as zeolite A and erionite. The method by which constraint index is determined is disclosed in U.S. Pat. No. 4,016,218, to which reference is made for a disclosure of the method and of the Constraint Indices for typical zeolites.

The metallosilicate zeolites which are preferred for use in the present catalysts are the aluminosilicate large pore size zeolites, with preference given to the zeolites with the faujasite structure, especially zeolite Y and the high silica forms of zeolite Y such as zeolite USY. The large pore size zeolites are preferred because their relatively open structure permits access by many of the bulky molecular species encountered in the high-boiling feeds commonly used in hydrocracking, so that consistent reduction in boiling range is achieved. The aluminosilicate zeolites provide a high-level of acid activity which results in high levels of conversion being obtainable at acceptable space velocities and temperatures and the high silica forms of zeolite Y, especially USY, have excellent long term stability for use in hydrocracking processes.

The medium pore size zeolites such as ZSM-5, ZSM-11, ZSM-12, ZSM-23 and ZSM-35 may also be in the present hydrocracking catalysts and may be preferred for certain applications, especially where hydrocracked products of low pour point are desired. Again, the medium pore size zeolites are preferbly used in the aluminosilicate from since this is the form in which the activity is usually the greatest. The medium pore size zeolites may be used in combination with the large pore size zeolites to form a hydrocracking catalyst with three (or more) acidic components, for example, MCM-41, USY and ZSM-5. The relative amounts of the three materials may be adjusted in accordance with the characteristics of the feed and of the desired products.

The use of the small pore size zeolites and of dense phase or clathrate zeolites such as ZSM-39 will not normally be favored since these zeolites are no longer used to a great extent in refining processes since they offer no advantages over the large and medium pore size zeolites, but they are not, in principle, to be excluded.

The relative amounts of the nesoporous support material with its associated metal component and the zeolite may be adjusted according to the demands of the intended use and this will normally require a consideration of the hydrogenation activity and cracking activity which are required in the catalyst. In most cases, a ratio of from 0.5:2 to 2:0.5 for the porous components will be typical, but ratios outside this range may be employed if desired, usually within the range of 10:1 to 1:10. A 1:1 ratio between the two porous components will be suitable for many hydrocracking applications.

The relatively smaller pore size molecular sieve zeolite can be composited with the mesoporous crystalline component in the same catalyst particle or alternatively they may be mixed as separate particles or staged as separate sections or zones of the hydrocracker. If the latter, the mesoporous components with its associated metal is preferably located upstream of the smaller pore sized molecular sieve component in order to promote the hydrogenation reactions before the feed encounters the more highly acidic zeolite which carries out the cracking.

If the mesoporous crystalline component and the relatively smaller pore size molecular sieve component are combined in the same catalyst particle or combined as separate particles in a physical mixture, the metal component may be incorporated by exchange or impregnation into the material using conventional techniques. Because the mesoporous crystalline component has a higher surface area than the zeolite component, the metal will be preferentially sorbed on the mesoporous component.

The porous crystalline materials, i.e the mesoporous material and the zeolite component are suitably used in a matrixed form in the catalysts and may suitably be formed into extrudates, pellets or other shapes to permit the passage of gases over the catalyst with the minimum pressure drop. The crystalline components may be matrixed or bound with active and inactive materials and synthetic or naturally occurring zeolites as well as inorganic materials such as clays, silica and/or metal oxides such as alumina, titania and/or zirconia. The latter may be either naturally occurring or in the form of gelatinous precipitates or gels including mixtures of silica and metal oxides. Use of a material in conjunction with the crystalline material, i.e. combined therewith or present during synthesis of the new crystal, which is active, tends to change the conversion and/or selectivity of the catalyst in certain organic conversion processes. Inactive materials suitable serve as diluents to control the amount of conversion in a given process so that products can be obtained economically and orderly without employing other means for controlling the rate of reaction. It may be desirable to provide at least a part of the foregoing matrix materials in colloidal form so as to facilitate extrusion of the bound catalyst components(s). The relative proportions of finely divided crystalline material and matrix vary widely, with the crystal content ranging from about 1 to about 90 percent by weight and more usually, particularly when the composite is prepared in the form of beads, in the range of about 2 to about 80 weight percent of the composite.

The catalyst may be treated by conventional presulfiding treatments, e.g. by heating in the presence of hydrogen sulfide, to convert oxide forms of the metals such as CoO or NiO to their corresponding sulfides.

EXAMPLE 1

This example illustrates a hydrocracking process using an amorphous hydrocracking catalyst and provides a base case for comparison. The feed used was a heavy vacuum gas oil obtained by fractionation of a Persian Gulf stock having the properties set out in Table 1 below.

TABLE 1

| Properties of Persian Gulf VGO | |
|---|---|
| Hydrogen, wt % | 12.6 |
| Nitrogen, ppm | 650 |
| Basic Nitrogen, ppm | 198 |
| Sulfur, wt % | 2.3 |
| API Gravity | 22.6 |
| Pour Point, °F. | 90 |
| Composition, wt % | |
| Paraffins | 27.7 |
| Mononaphthenes | 8.3 |
| Polynaphthenes | 14.6 |
| Aromatics | 49.4 |
| Simulated Distillation, wt % - °F. | |
| IBP | 531 |
| 5 | 687 |
| 10 | 715 |
| 20 | 745 |
| 30 | 770 |
| 40 | 793 |
| 50 | 816 |
| 60 | 841 |
| 70 | 866 |
| 80 | 897 |
| 90 | 942 |
| 95 | 970 |
| EP | 1071 |

The VGO feed was processed at 1200 psig hydrogen pressure, 4500 SCF/Bbl. hydrogen circulation, and 0.5 LHSV over an amorphous catalyst system consisting of DHC-2/DHC-6 catalysts (UOP). The DHC-2 catalyst serves as a hydrotreating catalyst to reduce nitrogen and sulfur content before the oil is processed in the hydrocracking section of the reactor containing the DHC-6 catalyst, where the bulk of the boiling range conversion occurs. The catalyst fill ratio was 38.4 grams (60 cc) of DHC-2 and 60.3 grams (90 cc) of DHC-6 for a total catalyst volume of 150 cc. The reactor severity is measured by 650° F.- boiling range conversion which is defined as:

$$650° F.- \text{Conversion} = \frac{650° F.+ \text{ in Feed (wt \%)} - 650° F.+ \text{ in Product (wt \%)}}{650° F.+ \text{ in Feed (wt \%)}}$$

The reactor severity was varied by adjusting reactor temperature in the range 700°–750° F. at constant LSV; the temperatures of the hydrotreating and hydrocracking sections of the reactor were maintained at equal temperature for all runs. The results of these runs are summarized graphically in FIGS. 1 and 2 together with the results of Examples 3 and 5.

EXAMPLE 2

Preparation of MCM-41

The following mixture (parts by weight, pbw) was charged to an autoclave:
83.7 pbw: Cetyltrimethylammonium (CTMA) hydroxide prepared by exchanging a 29 wt. pct. N,N,N-trimethyl-1-hexadecylanvnonium chloride solution with a hydroxide-for-halide exchange resin
1.7 pbw: Sodium aluminate,
4.1 pbw: Tetramethylammonim silicate (10% aqueous solution),
10.5 pbw: Precipitated hydrated silica (HiSil, Trademark).

The mixture was crystallized at 100° C. for 20 hours with stirrring under autogeneous pressure. The resulting product was recovered by filtration and dried in air at ambient temperature. A sample of the product was calcined at 540° C. for 1 hour in nitrogen, followed by 6 hours in air for characterization.

The calcined product had a surface area of 1120 m2/g and the following equilibrium absorption capacities in grams/100 grams:
H2O: 10.8
Cyclohexane: >50
n-hexane: >50
Benzene: 67

This product exhibited a very strong relative intensity line at 38.4±2.0 Å d-spacing, and weak lines at 22.6±1.0, 20.0±1.0, and 15.2±1.0 Å.

EXAMPLE 3

A sample of the MCM-41 (40 Å) prepared in accordance with the method described in Example 2 above, was exchanged with room temperature aqueous solutions of ammonium nitrate and subsequently dried overnight at 250° F. A portion of the resultant crystals was combined with Al2O3 to form a mixture of 65 parts, by weight MCM-41 and 35 parts alumina. Water was added to this mixture to allow the resulting catalyst to be formed into extrudates. The catalyst was activated by calcination at 950° F. in nitrogen for 6 hours followed by the replacement of the nitrogen with 5 v/v/min of air. the calcination was completed by raising the temperature to 1000° F. and maintaining that temperature for 18 hours. Nickel and tungsten were incorporated via incipient wetness coimpregnation using solutions of Ni(NO3)2.6H2O and (NH4)6H2W12O40.H2O, followed by drying overnight at 250° F., and calcination in air at 1000° F. for 3 hours. The physical and chemical properties of the NiW/MCM-41/Al2O3 catalyst are set out in Table 2 below:

TABLE 2

| NiW/MCM-41 Catalyst Properties | |
|---|---|
| Nickel, wt % | 3.7 |
| Tungsten, wt % | 9.2 |
| Sodium, ppm | 200 |
| Surface Area, m2/g | 530 |
| Pore Volume, cc/g | 0.780 |
| Particle Density, g/cc | 0.883 |
| Real Density, g/cc | 2.837 |

The NiW/MCM-41 catalyst was used as the hydrocracking catalyst in a DHC-2/NiW MCM-41 (40 Å) cascade moderate pressure hydrocracking reactor system. The identical feed and process conditions of Example 1 were used. The reactor was filled with 4.08 grams (6.4 cc) of DHC2 and 6.40 grams (13.8 cc) of Niw/MCM-41 with a total catalyst volume of 20.2 cc. Severity was varied by adjusting reactor temperature from 720°–770° F. The results of these runs are summarized in FIGS. 1 and 2.

EXAMPLE 4

Preparation of NiW/MCM-41/USY/Al₂O₃ hydrocracking catalyst

The product of Example 2 was exchanged with aqueous solutions of ammonium nitrate and subsequently dried overnight at 250° F. A portion of the resultant material was combined with alumina and a commercial USY (TOSOH HSZ-360HUA) to form a mixture of 40 parts, by weight, MCM-41, 40 parts USY, and 20 parts Al2O3. Water was added to this mixture to allow the resulting catalyst to be formed into extrudates.

The catalyst was activated by calcination as described in Example 3 above except that the calcination of the unimpregnated catalyst was completed in air at 1000° F. for 12 hours. Incorporation of the nickel and tungsten was made in the same way as described above. Physical and chemical properties of the NiW/MCM-41/USY/Al2O3 catalyst are shown in Table 3 below:

TABLE 3

| NiW/MCM-41/USY Hydrocracking Catalyst Properties | |
| --- | --- |
| Nickel, wt % | 4.4 |
| Tungsten, wt % | 14.8 |
| Sodium, ppm | 80 |
| Surface Area, m2/g | 430 |
| Pore Volume, cc/g | 1.000 |
| Particle Density, g/cc | 0.753 |
| Real Density, g/cc | 3.046 |

EXAMPLE 5

The catalyst of Example 4 was used as a hydrocracking catalyst in a set of moderate pressure hydrocracking runs. The same feed and process conditions as in Example 1 were used. The hydrotreating catalyst for this set of runs was a commercial NiMo/Al2O3 catalyst (HDN-60, American Cyanamid). The reactor was filled with 6.27 grams (8.0 cc) of HDN-60 and 4.45 grams (12.0 cc) of the composite NiW/MCM-41/USY catalyst. Severity was varied by adjusting reactor temperature from 700°–740° F. The results of these runs are summarized in FIGS. 1 and 2.

The activity comparison of the results of Examples 1, 4 and 5 is shown in FIG. 1. It can be seen that conversion activity for the composite catalyst was improved as compared to the DHC-6 and MCM-41 catalyst systems.

Figure 2:
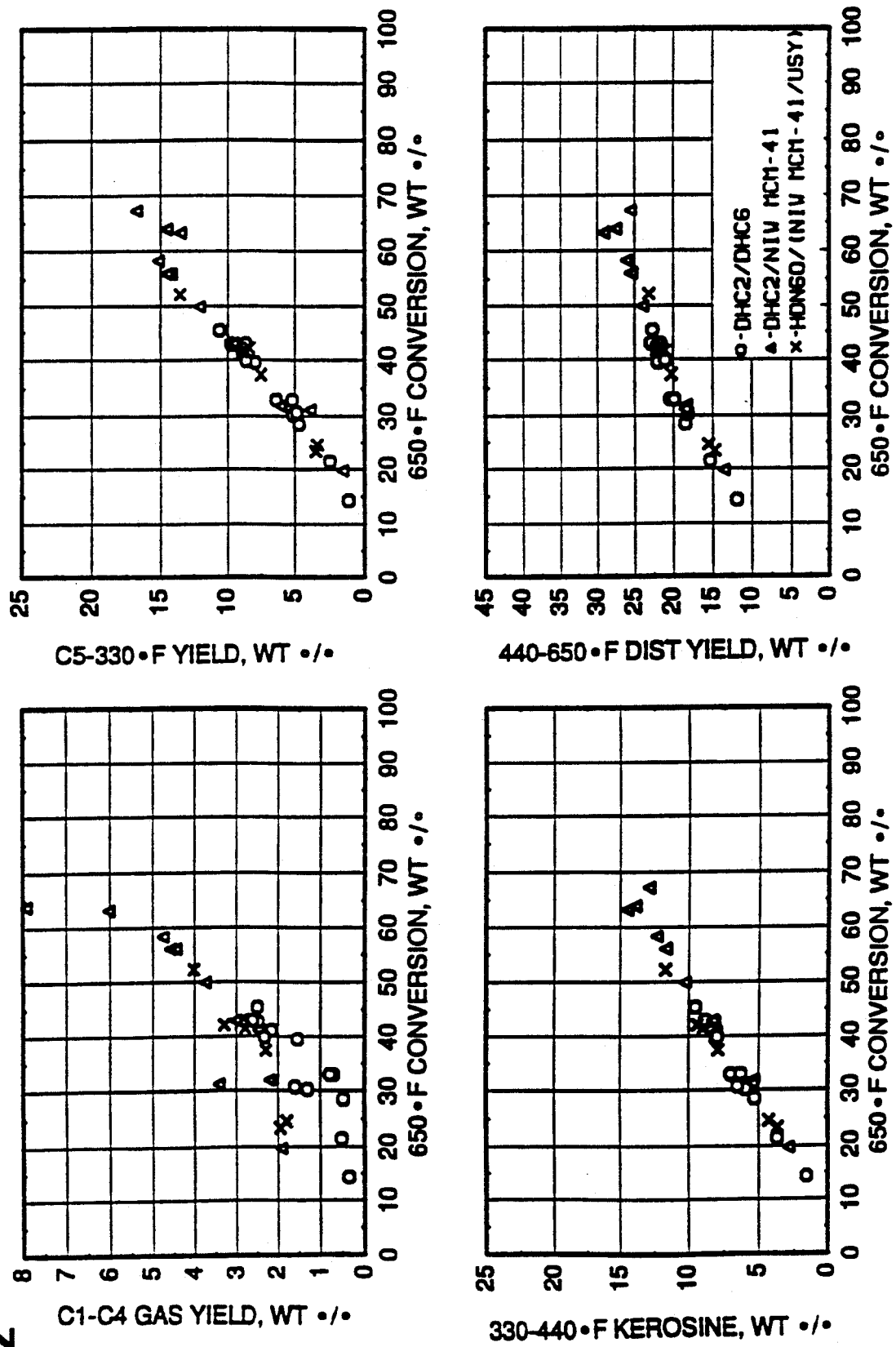

FIG. 2 shows the 650° F.- product selectivities as a function of 650° F.- boiling range conversion for the results of Examples 1, 4 and 5. These data show that kerosene (330°–440° F.) and distillate (440°–650° F.) selectivities are comparable for the MCM-41/USY catalyst as compared to the DHC-6 and MCM-41 catalysts. These results are also shown in tabular form for a conversion level of 45 wt % target feed conversion, in Table 4 below.

TABLE 4

| | Hydrocracking of VGO Blend (45 wt % Conversion, 1200 psig, 0.5 LHSV) | | |
| --- | --- | --- | --- |
| Catalyst | DHC-2/ DHC-6 | DHC-2/ NiW-MCM41 | HDN-60/NiW USY/MCM41 |
| Reactor Temp., °F. | 745 | 753 | 732 |
| Product Composition, wt % | | | |
| C1-C4 | 2.6 | 4.0 | 3.5 |
| C5-330° | 11 | 10.5 | 10.5 |
| 330-440° | 9.5 | 9.0 | 10.0 |
| 440-650° | 22.5 | 22.5 | 22.0 |
| 650-750° | 18 | 18 | 18 |
| 750°+ | 35 | 35 | 35 |
| H2 Cons, SCF/Bbl | 700-750 | 850 | 950 |

Improvements in conversion activity were obtained by the USY/MCM-41 composite catalyst and that there is a decrease in light gas yield compared to the MCM-41 catalyst. These results show that an MCM-41 ultra-large pore molecular sieve in combination with a smaller pore molecular sieve, can produce kerosene and distillate yields comparable to an amorphous catalyst system, but with better hydrocracking activity.

We claim:

1. A hydrocracking catalyst which having acidic functionality and hydrogenation-dehydrogenation functionality, and comprising a metal component, a zeolite component and an inorganic, porous crystalline phase material having pores with diameters of at least about 13 Angstrom Units and exhibiting, after calcination, an X-ray diffraction pattern least one peak at a d-spacing greater than about 18 Å.

2. A hydrocracking catalyst according to claim 1 in which the crystalline phase material exhibits, after calcination, a hexagonal arrangement of uniformly sized pores with diameters of at least about 13 Å and which exhibits, after calcination, a hexagonal electron diffraction pattern that can be indexed with a $d_{100}$ value greater than about 18 Angstrom Units.

3. A hydrocracking catalyst according to claim 1 in which the crystalline phase material has an X-ray diffraction pattern following calcination with at least one peak whose d-spacing corresponds to the $d_{100}$ value from the electron diffraction pattern.

4. A hydrocracking catalyst according to claim 1 in which the crystalline phase material exhibits a benzene adsorption capacity of greater than about 15 grams benzene per 100 grams at 50 torr and 25° C.

5. A hydrocracking catalyst according to claim 1 in which the crystalline phase material has a composition expressed as follows:

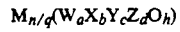

$$M_{n/q}(W_a X_b Y_c Z_d O_h)$$

wherein M is one or more ions; n is the charge of the composition excluding M expressed as oxides; q is the weighted molar average valence of M; n/q is the number of moles or mole fraction of M; W is one or more divalent elements; X is one or more trivalent elements; Y is one or more tetravalent elements; Z is one or more pentavalent elements; a, b, c, and d are mole fractions of W, X, Y, and Z, respectively; h is a number of from 1 to 2.5; and (a+b+c+d)=1.

6. A hydrocracking catalyst according to claim 5 wherein X comprises aluminum, boron, gallium or iron and Y comprises silicon or germanium.

7. A hydrocracking catalyst according to claim 6 wherein X comprises aluminum and Y comprises silicon.

8. A hydrocracking catalyst according to claim 1 in which the zeolite component comprises a large pore size zeolite having pores with an average diameter of at least 7.4 Å.

9. A hydrocracking catalyst according to claim 8 in which the large pore size zeolite has the faujasite structure.

10. A hydrocracking catalyst according to claim 9 in which the zeolite component comprises zeolite Y.

11. A hydrocracking catalyst according to claim 9 in which the zeolite component comprises zeolite USY.

12. A hydrocracking catalyst according to claim 1 in which the zeolite component comprises an intermediate pore size zeolite.

13. A hydrocracking catalyst according to claim 12 in which the zeolite component comprises ZSM-5 as the intermediate pore size zeolite.

14. A hydrocracking catalyst according to claim 1 in which the crystalline phase material comprises a non-layered material having pores with diameters of at least about 13 Angstrom Units and exhibiting, after calcination, an X-ray diffraction pattern with at least one peak at a d-spacing greater than about 18 Å.

15. A hydrocracking catalyst which having acidic functionality and hydrogenation-dehydrogenation functionality, and comprising a metal component, a zeolite component and an inorganic, porous crystalline phase material having pores with diameters of at least about 13 Angstrom Units and exhibiting, after calcination, a hexagonal electron diffraction pattern that can be indexed with a $d_{100}$ value greater than about 18 Angstrom Units.

16. A hydrocracking catalyst according to claim 15 in which the crystalline phase material exhibits, after calcination, an X-ray diffraction pattern with at least one peak at a d-spacing greater than about 18 Å.

17. A hydrocracking catalyst according to claim 15 in which the crystalline phase material has an X-ray diffraction pattern following calcination with at least one peak whose d-spacing corresponds to the $d_{100}$ value from the electron diffraction pattern.

18. A hydrocracking catalyst according to claim 15 in which the crystalline phase material exhibits a benzene adsorption capacity of greater than about 15 grams benzene per 100 grams at 50 torr and 25° C.

19. A hydrocracking catalyst according to claim 15 in which the crystalline phase material has a composition expressed as follows:

$$M_{n/q}(W_aX_bY_cZ_dO_h)$$

wherein M is one or more ions; n is the charge of the composition excluding M expressed as oxides; q is the weighted molar average valence of M; n/q is the number of moles or mole fraction of M; W is one or more divalent elements; X is one or more trivalent elements; Y is one or more tetravalent elements; Z is one or more pentavalent elements; a, b, c, and d are mole fractions of W, X, Y, and Z, respectively; h is a number of from 1 to 2.5; and (a+b+c+d)=1.

20. A hydrocracking catalyst according to claim 19 wherein X comprises aluminum, boron, gallium or iron and Y comprises silicon or germanium.

21. A hydrocracking catalyst according to claim 20 wherein X comprises aluminum and Y comprises silicon.

22. A hydrocracking catalyst according to claim 15 in which the zeolite component comprises a large pore size zeolite having pores with an average diameter of at least 7.4 Å.

23. A hydrocracking catalyst according to claim 22 in which the large pore size zeolite has the faujasite structure.

24. A hydrocracking catalyst according to claim 23 in which the zeolite component comprises zeolite Y.

25. A hydrocracking catalyst according to claim 24 in which the zeolite component comprises zeolite USY.

26. A hydrocracking catalyst according to claim 15 in which the zeolite component comprises an intermediate pore size zeolite.

27. A hydrocracking catalyst according to claim 26 in which the zeolite component comprises ZSM-5 as the intermediate pore size zeolite.

28. A hydrocracking catalyst according to claim 15 in which the catalyst comprises at least one metal of Group VIA, VIIA or VIIIA of the Periodic Table.

29. A hydrocracking catalyst according to claim 28 in which the catalyst comprises at least one metal of Group VIA and at least one metal of Group VIIIA of the Periodic Table.

30. A hydrocracking catalyst according to claim 15 in which the weight ratio of the crystalline phase material to the zeolite component is from 5:1 to 1:5.

31. A hydrocracking catalyst according to claim 30 in which the weight ratio of the crystalline phase material to the zeolite component is from 2:1 to 1:2.

32. A hydrocracking catalyst according to claim 15 in which the catalyst includes alumina, silica, silica-alumina, titania or zirconia as a binder.

* * * * *